United States Patent [19]

Mayfield

[11] 4,262,709

[45] Apr. 21, 1981

[54] MANUFACTURE OF TOFFEE AND LIKE CONFECTIONERY

[75] Inventor: Peter A. Mayfield, Hemel Hempstead, England

[73] Assignee: Baker Perkins Holdings Limited, Peterborough, England

[21] Appl. No.: 77,479

[22] Filed: Sep. 20, 1979

[51] Int. Cl.³ ............................................. A23G 1/20
[52] U.S. Cl. .................................... 141/67; 141/129; 222/273; 425/261
[58] Field of Search ................... 222/373; 141/67, 129; 425/261

[56] References Cited

U.S. PATENT DOCUMENTS

| 3,179,134 | 4/1965 | Sigrist | 141/67 |
| 3,557,716 | 1/1971 | Westin | 141/67 |
| 3,877,615 | 4/1975 | Anetsberger | 222/373 |
| 3,960,187 | 6/1976 | Stock | 222/373 |

FOREIGN PATENT DOCUMENTS 1510413  5/1978  United Kingdom .

Primary Examiner—James H. Derrington
Attorney, Agent, or Firm—Watson, Cole, Grindle & Watson

[57] ABSTRACT

A depositor deposits cooked toffee into a series of advancing moulds by means of a pump which pumps the toffee through the outer nozzle of a pair of concentric nozzles. After each discharge stroke of the pump, a pulse of heated compressed air is blown through the inner nozzle to separate the deposited portion of toffee from the toffee remaining in the nozzle.

2 Claims, 3 Drawing Figures

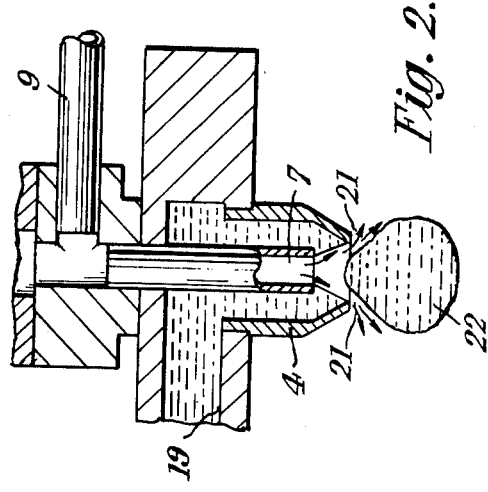
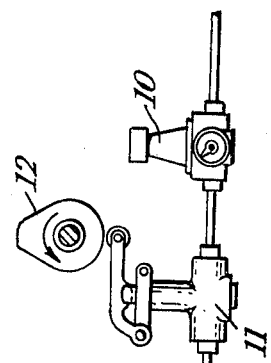
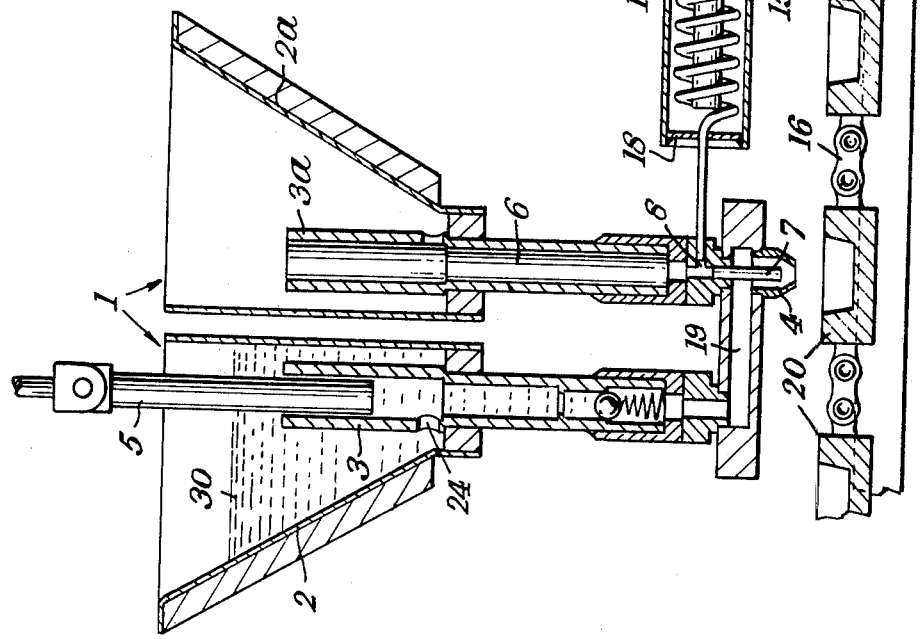

MANUFACTURE OF TOFFEE AND LIKE CONFECTIONERY

The ingredients which are to be found in a typical toffee recipe are sucrose, glucose, sweetened condensed milk, palm oil and butter. To make toffee, these materials are brought together, dissolved in water and heated to evaporate surplus water, and then held at a sufficiently high temperature in liquid state to allow caramelisation to take place. Once a sufficient degree of caramelisation has taken place the liquid material is, in accordance with existing procedure in toffee manufacture, cooled to a plastic state, and moulded into a continuous shaped rope from which individual pieces are cut and wrapped.

This procedure has certain disadvantages. The variation in shape of the final toffees is limited because of the limitation imposed by the necessity of cutting the toffees from a shaped rope. Furthermore, variations in atmospheric temperature can result in the cutter producing toffees which do not have satisfactorily squared ends.

It would be highly desirable to form the toffees by direct deposition of the cooked toffee into moulds. This would greatly increase the variety of shape which could be imparted to the toffees, be a simpler process, yield a higher production rate and ensure consistency in size, shape and presentation of the toffee pieces. Consistency in shape and size would have the added advantage that regularly shaped pieces lead to improved handling in a wrapping machine.

However, deposition in a mould of cooked toffee and like highly viscous confectionery involves a substantial difficulty. The material of a deposited portion will not readily separate from the material remaining in the depositing nozzle because it tends to stretch out in a tail that will not easily break under its own weight and gravity and tends to stay connected by the tail.

The invention is based on our discovery that this tail can be broken and successful separation achieved by the action of heated, compressed air on the material at the time separation is required.

The invention accordingly provides a depositor for depositing cooked toffee or other highly viscous confectionery into moulds traversed in succession beneath the depositor, the depositor comprising a pair of concentric nozzles, a pump arranged to perform alternative discharge and suction strokes and to deposit at each discharge stroke a measured quantity of the confectionery through the outer nozzle into a mould, and means operative after each discharge stroke of the pump to discharge through the inner nozzle a pulse of heated compressed air.

It is convenient to use for the purpose a modified form of the depositor described in British Patent Specifications Nos. 1481177 and 1510413. This depositor has two hoppers, each with its own pump, and concentric nozzles and is normally used for simultaneously depositing two separate materials, each of which is pumped through one of the nozzles. It can be readily adapted for use in depositing toffee or like highly viscous material through the outer nozzle, by stopping off the pump barrel supplying the inner nozzle and adding to it an inlet for the supply of heated, compressed air.

The invention will now be further explained with reference to the accompanying diagrammatic drawings, in which:

FIG. 1 is a sectional view, showing a depositor and associated mechanism for producing pulses of heated compressed air;

FIG. 2 is a detailed view showing the effect of a pulse of heated compressed air.

Figure 3:
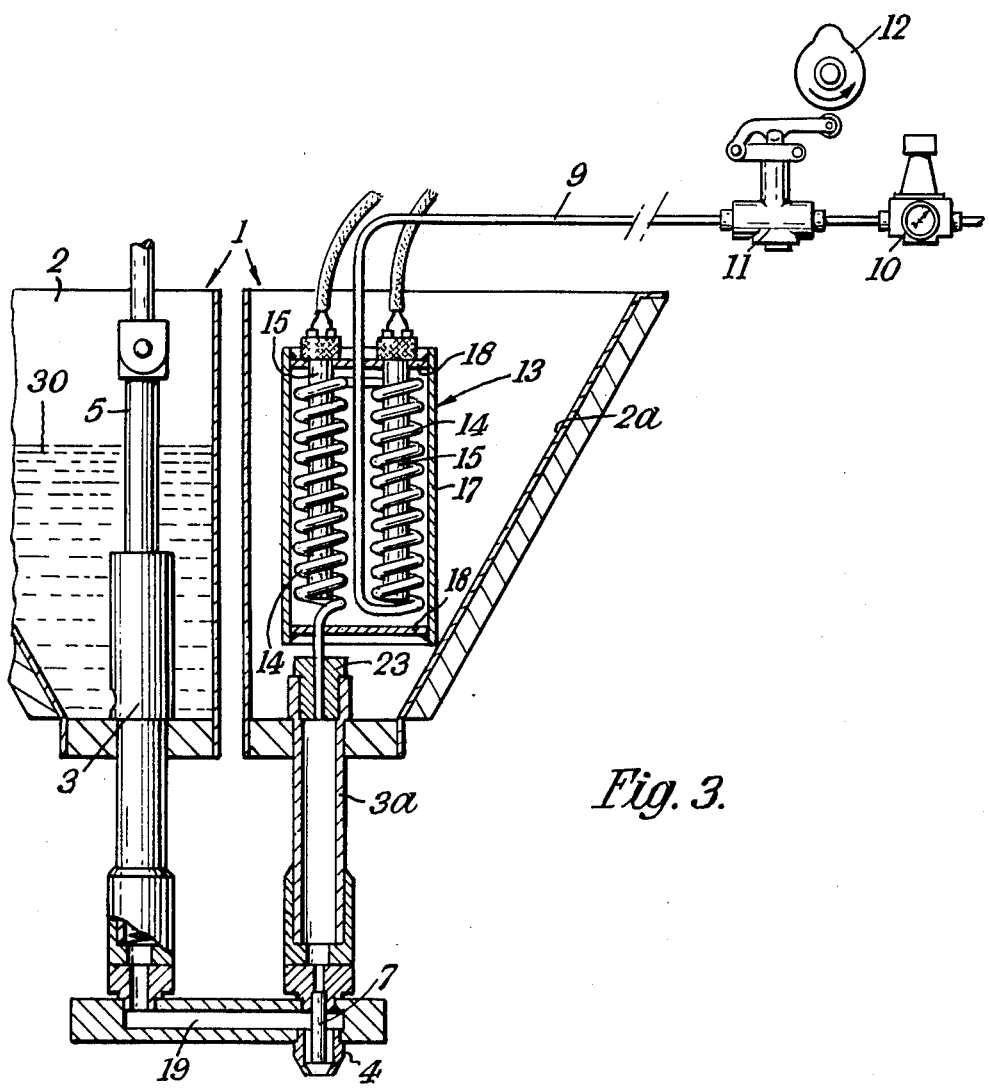
FIG. 3 is a view similar to FIG. 1 showing a modification.

The depositor 1 shown in FIG. 1 is the construction shown in British Pat. No. 1481177 and has twin hoppers 2, 2a, which contain respective pump barrels 3, 3a, which communicate with concentric outer and inner nozzles 4 and 7. In normal use of the depositor, as described in said Specification, each of the pump barrels contains a plunger, which is reciprocated by a cam (not shown) to pump material from its respective hopper to its respective nozzle.

The depositor is, however, modified in accordance with the present invention by removing the plunger from the barrel 3a and blocking this barrel off by a plug 6. The hopper 2a is empty and no confectionery is pumped to the inner nozzle 7. The hopper 2 contains cooked toffee 30 and the barrel 3 contains a plunger 5.

The plunger 5 draws toffee into the barrel 3 through a port 24 on its suction stroke and pumps toffee out of the barrel through a conduit 19 and the outer nozzle 4 on its discharge stroke.

The inner nozzle 7 has an inlet 8 connected to a compressed air supply via a pipe 9, fitted with a pressure regulator 10 and an air valve 11 controlled by a cam 12. Between the valve 11 and the inlet 8 is a heater 13. The heater 13 consists of a helical copper tube 14, forming part of the air pipe 9, wound round an inner tube 15 containing an electrical heating cartridge, and an outer steel casing 17, closed at its ends by discs 18. The electrical heating cartridge may be rated at 220 volts, single phase, 300 watts.

In operation, measured quantities of toffee 30 are pumped by the plunger 5 through the conduit 19 and the outer nozzle 4 for deposition into a mould 20. After each discharge stroke of the plunger 3, the cam 12 opens the valve 11 to cause a pulse of heated compressed air to pass through the inner nozzle 7 and force its way through the toffee and out as indicated at 21 in FIG. 2, thus cutting off the discharged portion 22 of toffee which falls into the mould 20.

A succession of moulds 20 is advanced beneath the depositor by a chain conveyor 16, which may dwell during deposition of the toffee in successive moulds. Alternatively, the conveyor may move continuously and the depositor be arranged to move with the conveyor during the discharge stroke of the pump and retract between successive suction strokes.

FIG. 3 shows an alternative embodiment in which the heater 13 has two heating cartridges in series and is positioned within the right hand hopper 2a. It is supplied with pulses of air through the pipe 9 shown in FIG. 1. The upper part of the barrel 3a is cut off and the lower end of the pipe 9 extends through a plug 23 fitted into the upper end of the barrel. Otherwise, it functions in exactly the same way as that shown in FIG. 1.

Whilst reference has been made to toffee material, there are a number of other highly viscous confectionery materials to which the invention can be successfully applied. For instance, a number of gelatinous substances are used in some confectionery recipes, such as gums, and these tend to produce highly viscous products after cooking.

What I claim as my invention and desire to secure by Letters Patent is:

1. A depositor for depositing highly viscous confectionery into moulds, comprising concentric inner and outer nozzles having adjacent lower outlet ends, and a conveyor for positioning the moulds in succession beneath the nozzles, a hopper to contain said confectionery disposed above the nozzles, a pump including a plunger arranged to perform alternative discharge and suction strokes and to effect at each discharge stroke positive displacement of a measured quantity of the confectionery from said hopper and through the outer nozzle, and means operative after each discharge stroke of the plunger to pass through the inner nozzle a pulse of heated compressed air to cut off from the confectionery contained in the outer nozzle confectionery which has been discharged from said outer nozzle and thereby enable said discharged confectionery to fall into a mould beneath said nozzles.

2. A depositor according to claim 2, which includes a pipe for supplying compressed air to the inner nozzle, a heater for heating the air in the pipe, a valve in the pipe disposed upstream of the heater and a cam operative to open the valve after each discharge stroke of the pump.

* * * * *